United States Patent
Migaldi et al.

(10) Patent No.: US 10,237,835 B1
(45) Date of Patent: Mar. 19, 2019

(54) TEMPORAL POWER CONTROL SYSTEM AND METHOD

(71) Applicant: T-Mobile USA, Inc., Bellevue, WA (US)

(72) Inventors: Scott Francis Migaldi, Cary, IL (US); John Joseph Humbert, IV, Olathe, KS (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 15/805,089

(22) Filed: Nov. 6, 2017

(51) Int. Cl.
  *H04B 7/00* (2006.01)
  *H04W 52/34* (2009.01)
  *H04W 52/14* (2009.01)
  *H04W 52/36* (2009.01)
  *H04W 52/54* (2009.01)

(52) U.S. Cl.
  CPC ......... *H04W 52/34* (2013.01); *H04W 52/143* (2013.01); *H04W 52/367* (2013.01); *H04W 52/54* (2013.01); *H04W 52/365* (2013.01)

(58) Field of Classification Search
  CPC . H04W 52/34; H04W 52/143; H04W 52/367; H04W 52/54
  USPC .............................. 455/522, 41.1, 41.2, 41.3
  See application file for complete search history.

(56) References Cited

U.S. PATENT DOCUMENTS

| | | | |
|---|---|---|---|
| 5,999,561 A * | 12/1999 | Naden ................... | H04B 1/707 375/142 |
| 9,674,720 B2 * | 6/2017 | Ludlow ................. | H04W 24/08 |
| 2005/0164645 A1 * | 7/2005 | Li ......................... | H04L 1/0003 455/69 |
| 2006/0084388 A1 * | 4/2006 | Li ......................... | H04W 52/54 455/67.11 |
| 2006/0267983 A1 * | 11/2006 | Karmi .................. | H04B 7/0632 345/440 |
| 2007/0259681 A1 * | 11/2007 | Cheng ................. | H04L 27/2608 455/522 |
| 2010/0152600 A1 * | 6/2010 | Droitcour ............... | A61B 5/05 600/534 |
| 2017/0332334 A1 * | 11/2017 | Liu ....................... | H04W 52/20 |
| 2017/0353163 A1 * | 12/2017 | Gazneli ................ | H03F 1/3247 |

* cited by examiner

*Primary Examiner* — Md K Talukder
(74) *Attorney, Agent, or Firm* — Perkins Coie LLP

(57) ABSTRACT

Systems and methods are described for reducing processing time of messages that are repeatedly received, with increasing frequency, by a device (e.g., user equipment, base station etc.). For example, the systems and methods would have a mobile device increase power, possibly to maximum power-out, per policy, if messages beyond the original are received and the time between those messages is decreasing. The decrease in time between messages indicates a more urgent need for the mobile device to power up. The systems and methods can be adapted for different types of messages (e.g., power-up, power-down, resource request, bandwidth request, service type, call type origination, quality-of-service request, application type, etc.). Each message type is associated with a policy (pre-determined or adaptive) that indicates the default behavior when the method detects a decrease in time between messages.

20 Claims, 4 Drawing Sheets

TEMPORAL POWER CONTROL SYSTEM AND METHOD

BACKGROUND

In a traditional telecommunications network, when user equipment (e.g., a mobile device) is required to power up in order to establish a designated level of power at the base station receive antenna, the mobile device is instructed by a detailed message from the base station to take such action. For example, when the received power from the mobile device drops below a threshold level, the base station determines that a power-up message is to be sent to the mobile device to ensure that the mobile is at or above the threshold level. When the mobile device receives the power-up message, it decodes the message and takes appropriate action (e.g., powers-up). If the mobile device did not hear the message or the level of power increase was not adequate (e.g., level of power at the mobile is below the threshold level), subsequent messages (e.g., a second message, third message, etc.) are sent until the desired level of power at the mobile is achieved. This process continues until adequate power is attained at the mobile device.

For example, in a scenario where a mobile device is moving down a street, it may lose power due to changing path loss. Once a base station detects the loss of power, it could direct the mobile device to power-up to ensure that the power level is above a certain threshold level. However, while that first power-up message is being sent by the base station, the mobile may enter a building (leading to further power loss) such that before the mobile can either decode and/or process the first power-up message, it receives subsequent power-up messages. In this manner, the mobile device is tasked with decoding and processing multiple power-up messages to achieve a certain power level. However, time is wasted by the mobile device as it decodes each power-up message and takes the specified action (e.g., increasing the power level at the mobile). Moreover, several iterations of power control messages are required, seldom in a fast changing path loss environment, until the desired level of power at the mobile device is achieved.

BRIEF DESCRIPTION OF THE DRAWINGS

Implementations of the disclosed technology will be described and explained through the use of the accompanying drawings.

Figure 1:
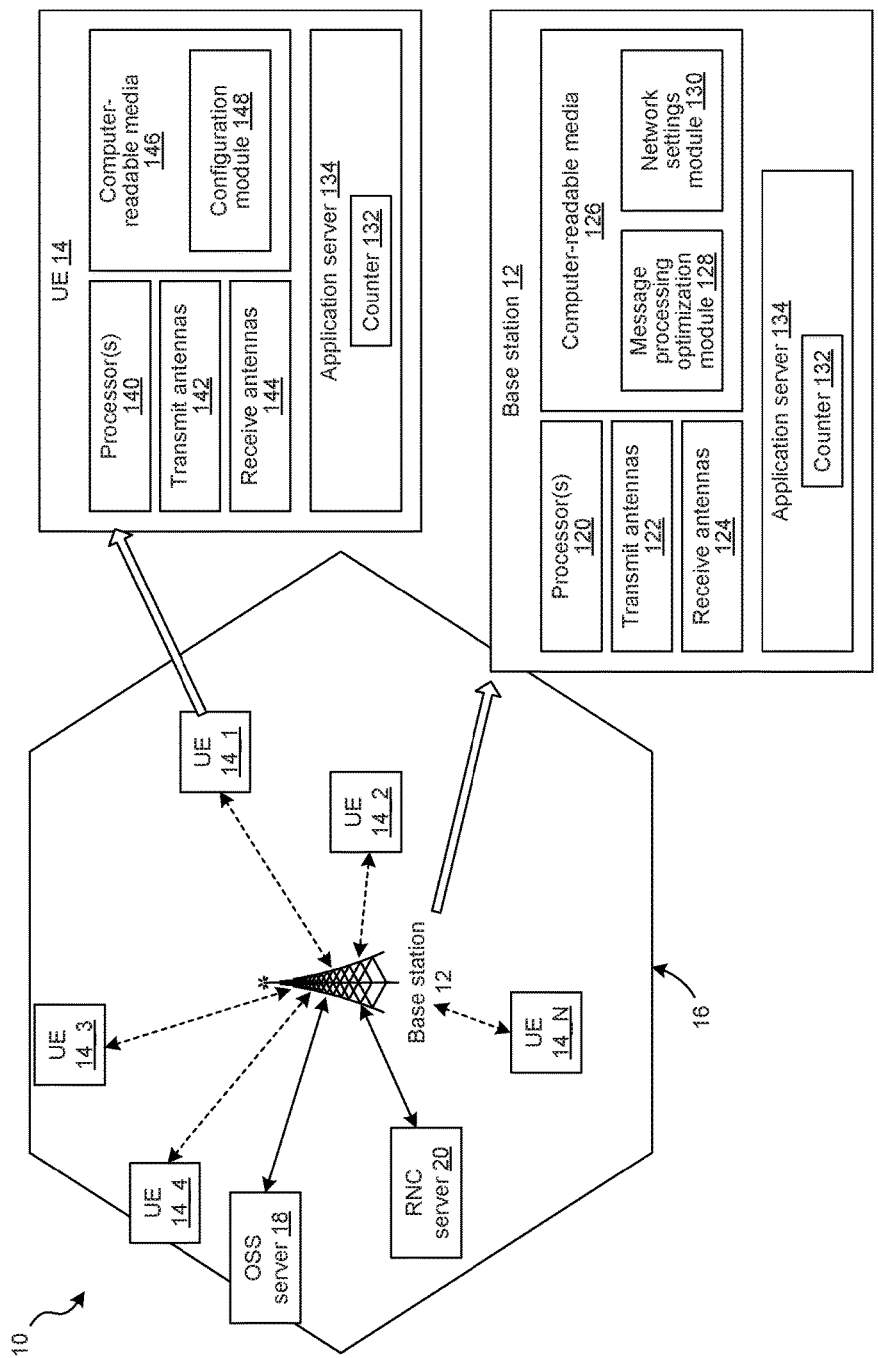
FIG. 1 illustrates a communication network, in accordance with various implementations.

The drawings have not necessarily been drawn to scale. Similarly, some components and/or operations may be separated into different blocks or combined into a single block for the purposes of discussion of some of the implementations of the present technology. Moreover, while the technology is amenable to various modifications and alternative forms, specific implementations have been shown by way of example in the drawings and are described in detail below. The intention, however, is not to limit the technology to the particular implementations described. On the contrary, the technology is intended to cover all modifications, equivalents, and alternatives falling within the scope of the technology as defined by the appended claims.

DETAILED DESCRIPTION

In light of the above problems, as well as others, the inventors have recognized that it would be beneficial to reduce decoding and processing time of messages that are repeatedly received, with increasing frequency, by a device (e.g., user equipment, base station etc.). Systems and methods are described herein for optimizing the decoding and processing of a series of messages that are received at an increased frequency. For example, the disclosed systems and methods would have a user equipment increase power, possibly to maximum power out, if messages beyond the original are received and the time between those messages is decreasing. The decrease in time between messages could indicate a more urgent need for the user equipment to respond to and/or take action in response to the messages (e.g., power up). The systems and methods may be adapted for different types of messages (e.g., power-up, power-down, quality of service, data speed request, resource request, bandwidth request, call type origination, service type, power headroom report, radio bearer, handover, etc.). Each message type may be associated with a policy (predetermined or adaptive) that indicates the default behavior when the systems and methods detect an increased rate of messages received (e.g., decrease in time between messages).

Various implementations of the system will now be described. The following description provides specific details for a thorough understanding and an enabling description of these implementations. One skilled in the art will understand, however, that the system may be practiced without many of these details. Additionally, some well-known structures or functions may not be shown or described in detail, so as to avoid unnecessarily obscuring the relevant description of the various implementations. The terminology used in the description presented below is intended to be interpreted in its broadest reasonable manner, even though it is being used in conjunction with a detailed description of certain specific implementations of the invention.

Suitable Computing Environments

FIG. 1 illustrates a telecommunications network 10 (also referred to herein as network 10) in accordance with various implementations or embodiments. The network 10 comprises a base station (BS) 12 communicatively coupled to multiple user devices, referred to as UEs 14_1, 14_2, ..., 14_N, where N is an integer. The BS 12 serves UEs 14 located within a geographical area, e.g., within a macro cell 16. FIG. 1 illustrates the macro cell 16 to be hexagonal in shape, although other shapes of the macro cell 16 may also be possible. In general, the network 10 comprises multiple macro cells 16, with each macro cell 16 including one or more BSs 12.

In some implementations, the UEs 14_1, ..., 14_N may comprise any devices for communicating over a wireless communication network. Such devices include mobile telephones, cellular telephones, mobile computers, Personal Digital Assistants (PDAs), radio frequency devices, handheld computers, laptop computers, tablet computers, palmtops, pagers, integrated devices combining one or more of the preceding devices, etc. As such, UEs 14_1, ..., 14_N may range widely in terms of capabilities and features. UEs 14_1, . . . , 14_N may also include SIM-less devices (i.e., mobile devices that do not contain a functional subscriber identity module ("SIM")), roaming mobile devices (i.e., mobile devices operating outside of their home access networks), and/or mobile software applications.

In some implementations, the BS 12 may communicate voice traffic and/or data traffic with one or more of the UEs 14_1, . . . , 14_N. The BS 12 may communicate with the UEs 14_1, . . . , 14_N using one or more communication protocols or standards. For example, the BS 12 may communicate with the UEs 14_1, . . . , 14_N using one or more standards, including but not limited to GSM, Internet Protocol (IP) Multimedia Subsystem (IMS), Time Division Multiple Access (TDMA), Universal Mobile Telecommunications System (UMTS), Evolution-Data Optimized (EVDO), Long Term Evolution (LTE), Generic Access Network (GAN), Unlicensed Mobile Access (UMA), Code Division Multiple Access (CDMA) protocols (including IS-95, IS-2000, and IS-856 protocols), Advanced LTE or LTE+, Orthogonal Frequency Division Multiple Access (OFDM), General Packet Radio Service (GPRS), Enhanced Data GSM Environment (EDGE), Advanced Mobile Phone System (AMPS), WiMAX protocols (including IEEE 802.16e-2005 and IEEE 802.16m protocols), High Speed Packet Access (HSPA), (including High Speed Downlink Packet Access (HSDPA) and High Speed Uplink Packet Access (HSUPA)), Ultra Mobile Broadband (UMB), etc.

The BS 12 may be communicatively coupled (e.g., using a backhaul connection, illustrated using solid lines in FIG. 1) to backhaul equipment, e.g., an operation support subsystem (OSS) server 18, a radio network controller (RNC) 20, etc. The RNC 20 can also be in the form of a mobility management entity when the wireless communication network 10 operates according to the long term evolution (LTE) standard or LTE Advanced standard.

In some implementations, the base station 12 may comprise processors 120, one or more transmit antennas (transmitters) 122, one or more receive antennas (receivers) 124, and computer-readable media 126. The processors 120 may be configured to execute instructions, which may be stored in the computer-readable media 126 or in other computer-readable media accessible to the processors 120. In some implementations, the processors 120 are a central processing unit (CPU), a graphics processing unit (GPU), or both CPU and GPU, or any other sort of processing unit. The base station 12 may also be in the form of a Node B (where the communications network 10 is 3G UMTS network) or in the form of an eNode B (where the wireless communication network 10 operates according to the LTE standard or LTE Advanced standard).

The one or more transmit antennas 122 may transmit signals to the UEs 14_1, . . . , 14_N, and the one or more receive antennas 124 may receive signals from the UEs 14_1, . . . , 14_N. The antennas 122 and 124 include antennas known in the art. For example, antennas 122 and 124 may include radio transmitters and radio receivers that perform the function of transmitting and receiving radio frequency communications. The antennas 122 and 124 may be included in a transceiver module of the BS 12.

The computer-readable media 126 may include computer-readable storage media ("CRSM"). The CRSM may be any available physical media accessible by a computing device to implement the instructions stored thereon. CRSM may include, but is not limited to, random access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical disk storage, magnetic cassettes, magnetic tape, magnetic disk storage or other magnetic storage devices, or any other medium which can be used to store the desired information and which can be accessed by the base station 12. The computer-readable media 126 may reside within the base station 12, on one or more storage devices accessible on a local network to the base station 12, on cloud storage accessible via a wide area network to the base station 12, or in any other location.

The computer-readable media 126 may store modules, such as instructions, data stores, and so forth that are configured to execute on the processors 120. For instance, the computer-readable media 126 may store a message processing optimization module 128 and a network settings module 130, as will be discussed in more detail herein later.

Although FIG. 1 illustrates the computer-readable media 126 in the BS 12 storing the message processing optimization module 128, the network settings module 130, and/or one or more other modules (not illustrated, may be stored in another component of the network 10 (e.g., other than the BS 12). For example, one or more of these modules may be stored in a computer-readable media included in the OSS server 18, the RNC 20, another server associated with the network 10, etc.

Although not illustrated in FIG. 1, various other modules (e.g., an operating system module, basic input/output systems (BIOS), etc.) may also be stored in the computer-readable media 126. Furthermore, although not illustrated in FIG. 1, the base station 12 may comprise several other components, e.g., a power bus configured to supply power to various components of the base station 12, one or more interfaces to communicate with various backhaul equipment, etc.

The UEs 14 may comprise processors 140, one or more transmit antennas (transmitters) 142, one or more receive antennas (receivers) 144, and computer-readable media 146. The processors 140 may be configured to execute instructions, which may be stored in the computer-readable media 146 or in other computer-readable media accessible to the processors 140. In some implementations, the processors 140 is a central processing unit (CPU), a graphics processing unit (GPU), or both CPU and GPU, or any other sort of processing unit. The one or more transmit antennas 142 may transmit signals to the base station 12, and the one or more receive antennas 144 may receive signals from the base station 12. The antennas 142 and 144 may be included in a transceiver module of the UE 14.

The computer-readable media 146 may also include CRSM. The CRSM may be any available physical media accessible by a computing device to implement the instructions stored thereon. CRSM may include, but is not limited to, RAM, ROM, EEPROM, a SIM card, flash memory or other memory technology, CD-ROM, DVD or other optical disk storage, magnetic cassettes, magnetic tape, magnetic disk storage or other magnetic storage devices, or any other medium which can be used to store the desired information and which can be accessed by the UE 14.

The computer-readable media 146 may store several modules, such as instructions, data stores, and so forth that are configured to execute on the processors 140. For instance, the computer-readable media 146 may store a configuration module 148. Although not illustrated in FIG. 1, the computer-readable media 146 may also store one or more applications configured to receive and/or provide voice, data and messages (e.g., short message service (SMS) messages, multi-media message service (MMS) messages, instant messaging (IM) messages, enhanced message service (EMS) messages, etc.) to and/or from another device or component (e.g., the base station 12, other UEs, etc.).

Although not illustrated in FIG. 1, the UEs 14 may also comprise various other components, e.g., a battery, a charging unit, one or more network interfaces, an audio interface, a display, a keypad or keyboard, a GPS receiver and/or other location determination component, and other input and/or output interfaces.

Although FIG. 1 illustrates only one UE (UE 14_1) in detail, each of the UEs 14_2, ..., 14_N may have a structure that is at least in part similar to that of the UE 14_1. For example, similar to the UE 14_1, each of the UEs 14_2, ..., 14_N may comprise processors, one or more transmit antennas, one or more receive antennas, and computer-readable media including a configuration module.

The network settings module 130 stored in the computer-readable media 126 maintains one or more network settings associated with the network 10. Individual network settings maintained by the network settings module 130 may be pertinent to a single UE of the UEs 14_1, ..., 14_N, a subset of the UEs 14_1, ..., 14_N, or each of the UEs 14_1, ..., 14_N. For example, a network setting of the one or more network settings may specify a maximum bit rate at which a UE (or each of the UEs 14_1, ..., 14_N) may transmit data to the BS 12. Another network setting of the one or more network settings may specify a transmit time interval (tti) used by each of the UEs 14_1, ..., 14_N to transmit data to the BS 12. Yet another network setting may specify a maximum power that each of the UEs 14_1, ..., 14_N may use to transmit data to the BS 12. The one or more network settings maintained by the network settings module 130 may also include any other type of network settings.

One or more of the one or more network settings maintained by the network settings module 130 may be communicated to the UEs 14_1, ..., 14_N (e.g., by the transmit antennas 122 to the receive antennas 144 of the UEs 14_1, ..., 14_N). Based on receiving the network settings, the UEs 14_1, ..., 14_N (e.g., the corresponding configuration modules 148) may configure themselves and communicate with the BS 12.

Generally, the network 10 is made up of multiple macro cells 16. Thus, depending on the configuration and size, the network 10 can represent and serve various regional areas, e.g., a city, a state, an entire nation, the whole world, etc.

A counter 132 may be located within an application server (AS) 134, which may be a telephony application server (TAS). The application server can also be located within the OSS server 18 or the RNC 20, or be located outside the network 10. The network 10 may include multiple application servers 134, and therefore multiple counters 132. Furthermore, each application server 134 may include more than one counter 132 to help keep track of various parameters.

The UEs 14 generally access or connect to the network 10 by a registration process. Likewise, the UEs 14 exit the network 10 by a de-registration process. While UEs 14 are registered with the network 10, they may communicate with the base station 12 by sending and/or receiving messages. Examples of messages include, but are not limited to the following types of messages: power-up, power-down, quality of service, data speed request, resource request, bandwidth request, call type origination, service type, power headroom report, radio bearer, handover. The UEs 14 and/or the base station 12 may perform one or more actions upon receiving a message.

Figure 2:
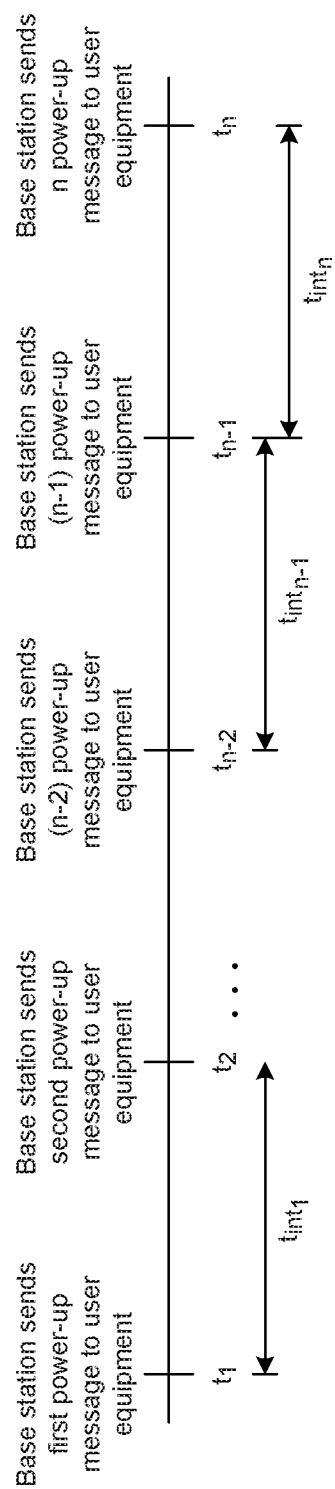
FIG. 2 is a diagram illustrating a sequence of operations for receiving messages at a user device associated with a user.

For example, upon receiving a data transmission from one of the UEs (e.g., UE 14_1), the base station 12 may determine that the power used by the UE to send the data transmission has fallen below a certain threshold level. The threshold level may be pre-determined (e.g., a specific threshold level value for the UE) or may be adaptive (e.g., based on the type of UE device, location of UE device, time of day, past behavior of UE device, behavior of UE devices in a geographic area, etc.). Once the base station determines that the received power from the UE device has fallen below the threshold level, it sends a power-up message to the UE device. At a first point in time T1, the base station maintains the number of power-up messages sent to the UE (e.g., UE 14_1) using the counter 132. For example, as depicted in FIG. 2, at time $t_1$, base station 12 sends a first power-up message to the user equipment.

However, if the user equipment does not receive the first power-up message or the level of power increase is not adequate (e.g., the user equipment sends another data transmission to the base station at a level of power that is still below the threshold level), at a second point in time $T_2$ (depicted in FIG. 2), the base station transmits a second power-up message to the user equipment. The base station updates the number of power-up messages sent to the UE (e.g., UE 14_1) using the counter 132. This process continues (depicted in FIG. 2 by $T_{n-2}$, $T_{n-1}$, and $T_n$) until adequate power is attained at the user equipment.

The user station receives and tracks the series of messages from the base station 12. For example, the user station computes the time interval between subsequent power-up messages (e.g., $t_{int(1)}$, $t_{int(n-1)}$, $t_{int(n)}$) to determine the rates of received messages, where each time interval denotes the difference in time stamps when power-up messages were received:

$t_{int(1)}$=<received timestamp of second power-up message>-<received timestamp of first power-up message>

$t_{int(n-1)}$=<received timestamp of (n-1) power-up message>-<received timestamp of (n-2) power-up message>

$t_{int(n)}$=<received timestamp of (n) power-up message>-<received timestamp of (n-1) power-up message>

The user equipment may select one or more actions in accordance with an action policy based on, for example, the rates of received messages. The action policy may be based on the type of message received. For example, if the type of message received is a power-up message, the user equipment may select an action policy associated with power-up messages. Similarly, if the type of message received is a quality-of-service message, the user equipment may select an action policy associated with quality-of-service messages. Each action policy may be associated with one or more actions that can be performed in response to the received messages.

An action policy may have an associated default action, such as increasing the power of data transmission to a maximum power level. In some implementations, an action policy comprises range-based actions. For example, an action policy may specify increasing the power of data transmission to a certain power level based on a range of rates of received data messages (e.g., if rate of received messages is between 2 and 3, increase the power level of data transmission to 60%; if rate of received messages is between 4 and 5, increase the power level of data transmission to 80%, etc.). The user equipment may select an action policy and perform one or more associated actions without decoding and/or processing the received message. For example, after determining the type of the messages (e.g., power-up) and determining the rates of received messages (e.g., increasing rate of 2.5), the user equipment may increase the power of data transmission to a certain level (e.g., 60%) without examining the contents of the power-up messages to identify, for example, the desired power level requested by the base station. In this manner, the user equipment reduces processing time because it does not waste time by decoding each power-up message received from the base station. Moreover, several iterations of the same message (e.g., multiple power-up messages) are not required, especially in a fast changing path loss environment, because the user equipment reacts in a much more timely manner by performing remedial actions in response to an increased frequency of received messages (e.g., by increasing the power level to a maximum power level).

In a similar manner, the base station 12 may track a series of messages from one or more user equipment 14 (e.g., power-down messages). Based on the rates of received messages, the base station may select one or more actions in accordance with an action policy. The action policy may be based on the type of message received. For example, if the type of message received is a power-down message, the user equipment may select an action policy associated with power-down messages. Further, similar to the action policies at the user-equipment side, action policies at the base station 12 may be associated with one or more actions that can be performed in response to the received messages.

Figure 3A:
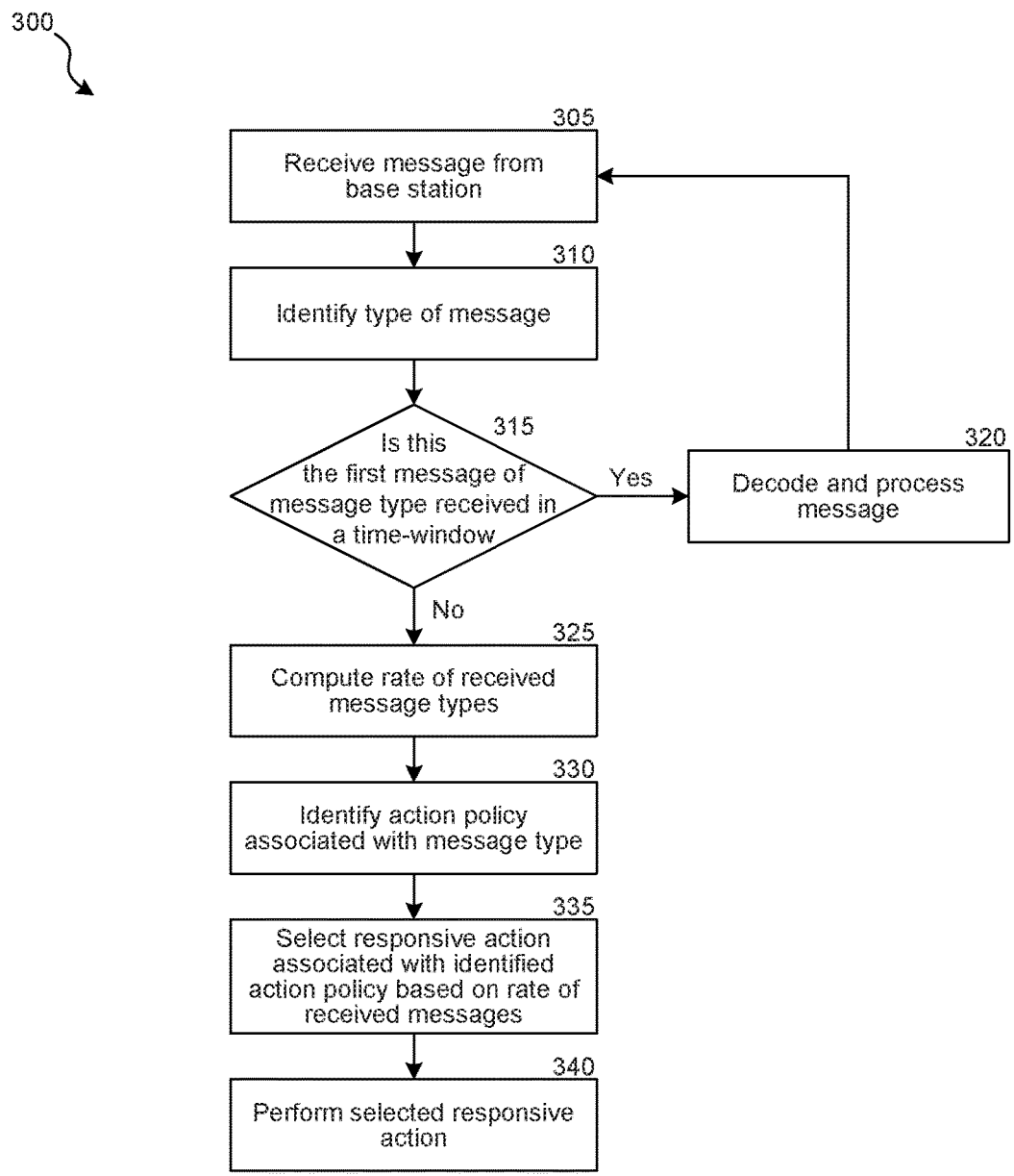
FIG. 3A is a flow diagram illustrating a method of optimizing the decoding and processing of a series of messages within the communication network of FIG. 1.

FIG. 3A is a flow diagram illustrating a method 300 of optimizing the decoding and processing of a series of messages within the communication network of FIG. 1. While FIG. 3A depicts that method 300 is performed by a user equipment, similar steps may be performed by a base station. Process 300 begins at step 305, where a user equipment receives a message from a base station, such as the message types noted above. At step 310, process 300 identifies the type of the received message. After identifying the message type, at step 315, process 300 determines whether the received message is a first message received of the identified message type in a particular time window. The time window may be pre-determined or may be adaptive, and may be based on one or more parameters, such as the type of message, time of day, location of user equipment, location of base station, past behavior of user equipment/base station, and/or other environmental factors. For example, if the received message is a power-up message, the time window may be five minutes, whereas for a quality-of-service message, the time window may be 10 minutes. If the received message is a first message received of the identified message type in a particular time window, at step 320, process 300 decodes and processes the received message. For example, if the received message is a power-up message, the user equipment decodes and processes the power-up message to increase the power level to a level specified in the power-up message.

On the other hand, if the received message is not the first message received of the identified message type in a particular time window (e.g., the received message is a second, third, etc. message of the identified message type), process 300 proceeds to step 325. At step 325, process 300 computes a set of rates of received message types. For example, a set of rates of received message types comprises one or more rates of receipt that are based on the difference between timestamps at which each subsequent message is received (as depicted in FIG. 2 by $t_{int(1)}$, $t_{int(n-1)}$, $t_{int(n)}$) Process 300 then proceeds to step 330. In some implementations, process 300 proceeds to step 330 based on certain criteria that may be customizable depending on the message type. For example, for power-up message, process 300 proceeds to step 330 when the rates in the set of rates of receipt of the received series of messages are increasing (e.g., messages are being received at a greater rate/frequency such that $t_{int(n)} < t_{int(n-1)}$, or $t_n - t_{in-1}$ is decreasing). In some implementations, process 300 proceeds to step 330 as soon as a second message of the same message type is received. For example, for quality-of-service messages, process 300 proceeds to step 330 as soon as it receives a second quality-of-service message.

At step 330, process 300 identifies an action policy associated with the message type. A common action policy may be identified for all (or a subset of) message types. Each action policy may be associated with one or more actions that can be performed in response to the received messages. An action policy may have an associated default action, such as increasing the power of data transmission to a maximum power level. In some implementations, an action policy comprises range-based actions. For example, an action policy may specify increasing the power of data transmission to a certain power level based on a range of rates of received data messages (e.g., if rate of received messages is between 2 and 3, increase the power level of data transmission to 60%; if rate of received messages is between 4 and 5, increase the power level of data transmission to 80%, etc.). Process 300 may select an action policy and perform one or more associated actions without the user equipment decoding and/or processing the received message.

At step 335, process 300 selects a responsive action associated with the identified action policy. The responsive action may be selected based on, for example, the rates of receipt of the messages. For example, after determining the type of the messages (e.g., power-up) and determining the rates of received messages (e.g., rate of 2.5), process 300 may select a response action instructing the user equipment to increase the power of data transmission to a certain level (e.g., 60%) corresponding to the rate of received messages. Process 300 then instructs the user equipment, at step 340, to change its behavior by, for example, performing the selected responsive action (e.g., increasing the power of data transmission to 60%).

Upon receiving subsequent messages of the same message type, process 300 may perform one or more of steps 325-340 without waiting for the user equipment to decode and process each received message. In this manner, process 300 saves the communication link between the base station and user equipment and the user's experience is improved.

Figure 3B:
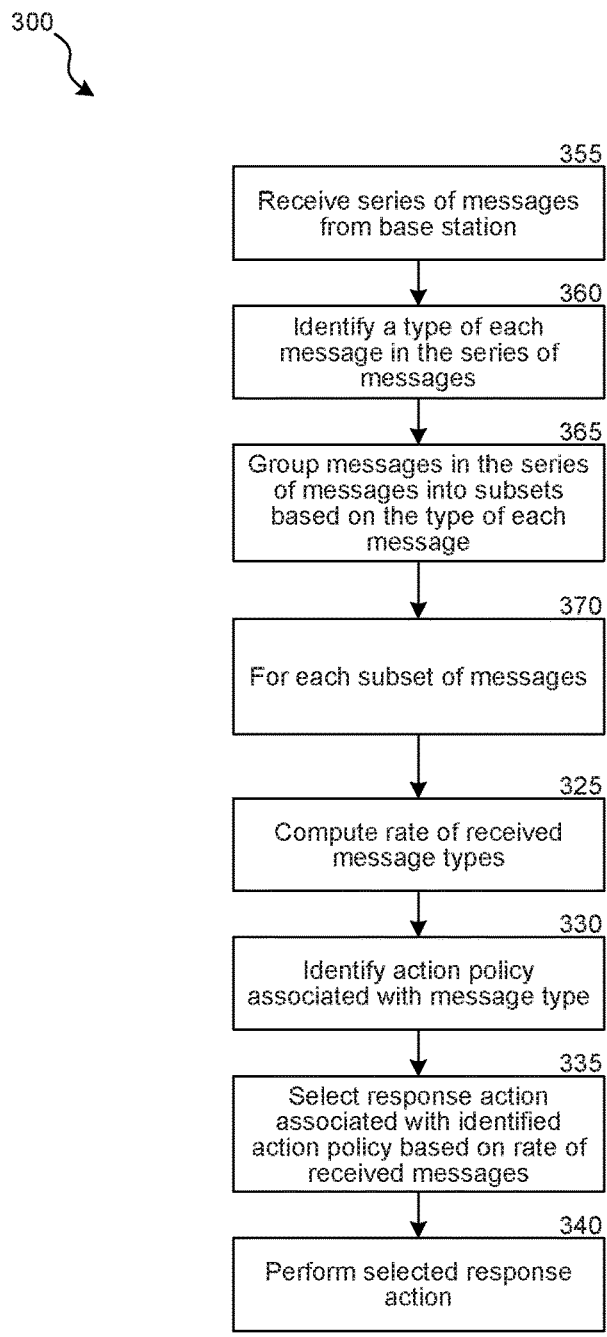
FIG. 3B is a flow diagram illustrating a method of optimizing the decoding and processing of a series of messages within the communication network of FIG. 1.

FIG. 3B is a flow diagram illustrating a method 300 of optimizing the decoding and processing of a series of messages within the communication network of FIG. 1. While FIG. 3B depicts that method 300 is performed by a user equipment, similar steps may be performed by a base station. Process 300 begins at step 355 when the user equipment receives a series of messages from the base station. The series of messages may comprise messages of the same type or different types, such as the message types noted above. For example, the series of messages comprises four power-up messages and two quality-of-service messages. At step 360, process 300 identifies a type of each message in the series of received messages. For example, process 300 identifies that four of the received messages are of a type power-up and two of the received messages are of a type quality-of-service. Process 300 then, at step 365, groups the received messages into subsets that are based on the type of each message. For example, process 300 creates a first subset of power-up messages and a second subset of quality-of-service message. In some implementations, messages of two or more message types may be grouped together (e.g., messages of types power-up and power-down may be grouped into one subset). After the received messages are grouped into message type subsets, for each message type subset identified at step 370, process 300 proceeds to steps 325-340 that are described in detail above.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of implementations of the system is not intended to be exhaustive or to limit the system to the precise form disclosed above. While specific implementations of, and examples for, the system are described above for illustrative purposes, various equivalent modifications are possible within the scope of the system, as those skilled in the relevant art will recognize. For example, some network elements are described herein as performing certain functions. Those functions could be performed by other elements in the same or differing networks, which could reduce the number of network elements. Alternatively or additionally, network elements performing those functions could be replaced by two or more elements to perform portions of those functions. In addition, while processes, message/data flows, or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes, message/data flows, or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges. Those skilled in the art will also appreciate that the actual implementation of a database may take a variety of forms, and the term "database" is used herein in the generic sense to refer to any data structure that allows data to be stored and accessed, such as tables, linked lists, arrays, etc.

The teachings of the methods and system provided herein can be applied to other systems, not necessarily the system described above. The elements and acts of the various implementations described above can be combined.

Any patents and applications and other references noted above, including any that may be listed in accompanying filing papers, are incorporated herein by reference. Aspects of the technology can be modified, if necessary, to employ the systems, functions, and concepts of the various references described above.

These and other changes can be made to the invention in light of the above Detailed Description. While the above description describes certain implementations of the technology, no matter how detailed the above appears in text, the invention can be practiced in many ways. Details of the system may vary considerably in its implementation details, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the invention to the specific implementations disclosed in the specification, unless the above Detailed Description section explicitly defines such terms. Accordingly, the actual scope of the invention encompasses not only the disclosed implementations, but also all equivalent ways of practicing or implementing the invention under the claims.

While certain aspects of the technology are presented below in certain claim forms, the inventors contemplate the various aspects of the technology in any number of claim forms. For example, while only one aspect of the invention is recited as embodied in a computer-readable medium, other aspects may likewise be embodied in a computer-readable medium. Accordingly, the inventors reserve the right to add additional claims after filing the application to pursue such additional claim forms for other aspects of the technology.

We claim:

1. A method for optimizing processing of power-up messages received at a wireless mobile device that is communicatively coupled to a base station in a telecommunications network, the method comprising:
   receiving, at the mobile device, a series of power-up messages from the base station;
   computing rates of received power-up messages based on timestamps of power-up messages in the series of power-up messages;
   identifying an action policy, wherein the action policy comprises a set of responsive actions to be taken in response to receiving the series of power-up messages;
   selecting a responsive action from the set of responsive actions based on the rates of received power-up messages; and
   implementing the selected responsive action by changing a behavior of the mobile device,
      wherein changing the behavior includes increasing power of data transmission by the user equipment to a power level specified by the selected responsive action, and
      wherein the power level specified by the selected response action is greater than a power level specified by at least one message in the series of power-up messages.

2. The method of claim 1,
   wherein the series of power-up messages comprises a first power-up message with a first timestamp, a second power-up message with a second timestamp, and a third power-up message with a third timestamp, and wherein the rates of received power-up messages are based on differences between the first timestamp, the second timestamp, and the third timestamp.

3. The method of claim 1, wherein the power level specified by the selected responsive action is based on a threshold amount.

4. The method of claim 1, wherein the power level specified by the selected responsive action is a maximum power level of the mobile device.

5. The method of claim 1, wherein the set of responsive actions comprises responsive actions that specify increasing power of data transmission by the user equipment to a power level based on a range of rates of received power-up messages.

6. The method of claim 1, wherein the series of power-up messages includes a first power-up message and a second power-up message, wherein the first power-up message is received prior to the second power-up message, and wherein, upon receiving the second power-up message, the mobile device directly increases power of data transmission to a threshold amount.

7. The method of claim 1, wherein the action policy is based on a type of the mobile device.

8. The method of claim 1, wherein the behavior of the mobile device is changed without the mobile device processing the series of power-up messages.

9. A method for optimizing processing messages received at a user equipment that is communicatively coupled to a base station in a telecommunications network, the method comprising:

receiving, at the user equipment, a first message from the base station, wherein the first message is of a first message type, and wherein the first message is associated with a first timestamp;

receiving, at the user equipment, a second message from the base station, wherein the second message is of the first message type, wherein the second message is associated with a second timestamp, and wherein the second message is received after the first message;

receiving, at the user equipment, a set of subsequent messages from the base station, wherein each message in the set of subsequent messages is of the first message type, wherein each message in the set of subsequent messages is associated with a subsequent timestamp, and wherein each message in the set of subsequent messages is received after the second message;

computing a set of rates of received messages based on the first timestamp, the second timestamp, and timestamps of each message in the set of subsequent messages;

identifying an action policy, wherein the action policy comprises a set of responsive actions to be taken in response to receiving messages from the base station;

selecting a responsive action from the set of responsive actions based on the rates of received messages in the set of rates of received messages; and changing a behavior of the user equipment in accordance with the selected responsive action.

10. The method of claim 9, wherein the first message type is:

power-up,
power-down,
quality of service,
data speed request,
resource request,
bandwidth request,
call type origination,
service type,
power headroom report,
radio bearer, or
handover.

11. The method of claim 9, wherein, upon receiving the second message, the user equipment directly changes behavior in accordance with a default responsive action.

12. The method of claim 9, wherein the identified action policy is based on the first message type.

13. The method of claim 9, wherein the identified action policy is based on a type of the user equipment.

14. The method of claim 9, wherein the behavior of the user equipment is changed without the user equipment processing the second message or any message in the set of subsequent messages.

15. At least one non-transitory computer-readable memory carrying instructions to be executed by at least one processor, wherein the instructions are performing a method for optimizing processing messages received at a user equipment that is communicatively coupled to a base station in a telecommunications network, the method comprising:

receiving, at the user equipment, a series of messages from the base station;

identifying a type of each message in the series of messages;

grouping messages in the series of messages into subsets of messages based on the type of each message, wherein each subset of messages comprises messages of a same type; for each subset of messages:

computing rates of received messages, based on timestamps of messages in the subset of messages;

identifying an action policy, wherein the action policy comprises a set of responsive actions to be taken in response to receiving the series of power-up messages;

selecting a responsive action from the set of responsive actions based on the rates of received power-up messages; and changing a behavior of the user equipment based on the selected responsive action.

16. The at least one non-transitory computer-readable memory of claim 15, wherein an identified action policy for a subset of messages is based on a type of messages in the subset of messages.

17. The at least one non-transitory computer-readable memory of claim 15, wherein an identified action policy for a subset of messages is based on a type of the user equipment.

18. The at least one non-transitory computer-readable memory of claim 15, wherein the series of messages are of a following type: power-up, power-down, quality of service, data speed request, resource request, bandwidth request, call type origination, service type, power headroom report, radio bearer, handover, or any combination thereof.

19. The at least one non-transitory computer-readable memory of claim 15, wherein each responsive action in the set of responsive actions corresponds to a range of rates of received messages.

20. The at least one non-transitory computer-readable memory of claim 15, wherein the behavior of the user equipment is changed without the user equipment processing the series of messages.

\* \* \* \* \*